United States Patent
Gormley et al.

(10) Patent No.: US 10,667,644 B2
(45) Date of Patent: Jun. 2, 2020

(54) BEVERAGE DISPENSER WITH A WATER-RESISTANT VACUUM INLET

(71) Applicant: Haier US Appliance Solutions, Inc., Wilmington, DE (US)

(72) Inventors: Joseph Emil Gormley, Louisville, KY (US); Justin Tyler Brown, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 456 days.

(21) Appl. No.: 15/402,315

(22) Filed: Jan. 10, 2017

(65) Prior Publication Data
US 2018/0192814 A1    Jul. 12, 2018

(51) Int. Cl.
*A47J 31/44*    (2006.01)

(52) U.S. Cl.
CPC ................................. *A47J 31/4403* (2013.01)

(58) Field of Classification Search
CPC ........................... A47J 31/4403; A47J 31/4407
USPC .......................................................... 99/299
See application file for complete search history.

(56) References Cited

U.S. PATENT DOCUMENTS

| | | | |
|---|---|---|---|
| 5,460,078 A * | 10/1995 | Weller | A47J 31/002 99/295 |
| 8,998,176 B2 | 4/2015 | Bishop et al. | |
| 9,295,358 B2 | 3/2016 | Vastardis et al. | |
| 2011/0097466 A1* | 4/2011 | Vastardis | A47J 31/44 426/433 |
| 2012/0100275 A1* | 4/2012 | Bishop | A47J 31/32 426/474 |
| 2017/0188728 A1* | 7/2017 | Votolao | A47J 47/01 |
| 2017/0290455 A1* | 10/2017 | Ha | A47J 31/04 |
| 2017/0295992 A1* | 10/2017 | Mangold | A47J 31/002 |

FOREIGN PATENT DOCUMENTS

JP    2015073794 A    4/2015

* cited by examiner

*Primary Examiner* — Ibrahime A Abraham
*Assistant Examiner* — Ahmad Abdel-Rahman
(74) *Attorney, Agent, or Firm* — Dority & Manning, P.A.

(57) ABSTRACT

A beverage brewing system is provided that includes a brewing body defining a brew chamber and a lid that is removably attachable to the brewing body to seal the brew chamber. The brewing system further includes a vacuum pump for drawing a vacuum in the brew chamber through a vacuum line assembly. An inlet to the vacuum line assembly is positioned above a top lip of the brewing body and a baffle may extend from the lid to assist in preventing water within the brew chamber from splashing, sloshing, or otherwise entering the inlet to the vacuum line assembly.

18 Claims, 5 Drawing Sheets

BEVERAGE DISPENSER WITH A WATER-RESISTANT VACUUM INLET

FIELD OF THE INVENTION

The present subject matter relates generally to beverage dispensers, and more particularly to beverage dispensers including a water-resistant vacuum inlet.

BACKGROUND OF THE INVENTION

Beverage dispensers typically mix together water and a substance for creating a beverage, such as, e.g., coffee, tea, hot chocolate, lemonade, or the like. For example, in a typical coffee brewing process, coffee grounds are steeped in, saturated, or otherwise mixed with hot water (e.g., around 200° F.) to create hot coffee. Heated water accelerates the brewing process and allows for heated coffee to be brewed in a matter of minutes. Another method of brewing coffee is a cold brew process during which coffee grounds are brewed near room temperature (e.g., around 70° F.). However, such a cold brewing process takes a significantly longer amount of time to brew, e.g., around five to twenty-four hours.

Certain cold brew beverage dispensers place a brew chamber under a vacuum, which may significantly decrease the cold brew time, e.g., down to ten minutes or less. Such beverage dispensers include a vacuum line that extends into the brew chamber and a vacuum pump which draws a vacuum within the brew chamber during the brewing process. However, the vacuum may inadvertently draw moisture in the form of liquid water or water vapor into the vacuum line, resulting in problems with the vacuum pump.

Accordingly, a beverage dispenser that includes improved features for eliminating moisture within the vacuum line would be useful. More specifically, a cold brew beverage dispenser having features for preventing liquid from entering a vacuum line would be particularly beneficial.

BRIEF DESCRIPTION OF THE INVENTION

The present subject matter provides a beverage brewing system that includes a brewing body defining a brew chamber and a lid that is removably attachable to the brewing body to seal the brew chamber. The brewing system further includes a vacuum pump for drawing a vacuum in the brew chamber through a vacuum line assembly. An inlet to the vacuum line assembly is positioned above a top lip of the brewing body and a baffle may extend from the lid to assist in preventing water within the brew chamber from splashing, sloshing, or otherwise entering the inlet to the vacuum line assembly. Additional aspects and advantages of the invention will be set forth in part in the following description, or may be apparent from the description, or may be learned through practice of the invention.

In accordance with one embodiment, a beverage brewing system defining a vertical direction and a radial direction is provided. The beverage brewing system includes a brewing body defining a brew chamber for receiving brewing contents, the brewing body including a bottom wall, a sidewall extending from the bottom wall substantially along the vertical direction, and a vacuum channel having an inlet positioned proximate a top lip of the sidewall of the brewing body. A lid is removably attachable to the brewing body, the lid including a circumferential seal for engaging the brewing body and sealing the brew chamber. A vacuum pump is in fluid communication with the vacuum channel through a vacuum line, the vacuum pump being configured for drawing air out of the brew chamber to create a vacuum in the brew chamber. A riser tube is in fluid communication with the inlet of the vacuum channel, the riser tube defining a riser inlet that extends above the top lip of the brewing body along the vertical direction.

In accordance with another embodiment, a beverage brewing system defining a vertical direction and a radial direction is provided. The beverage brewing system includes a brewing body defining a brew chamber for receiving brewing contents, the brewing body including a bottom wall, a sidewall extending from the bottom wall substantially along the vertical direction to a top lip of the sidewall. A lid is removably attachable to the brewing body, the lid including a circumferential seal for engaging the brewing body and sealing the brew chamber. A vacuum pump is configured for drawing air out of the brew chamber to create a vacuum in the brew chamber. A vacuum line assembly defines a vacuum inlet positioned above the top lip of the brewing body along the vertical direction, the vacuum line assembly providing fluid communication between the brewing chamber and the vacuum pump.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
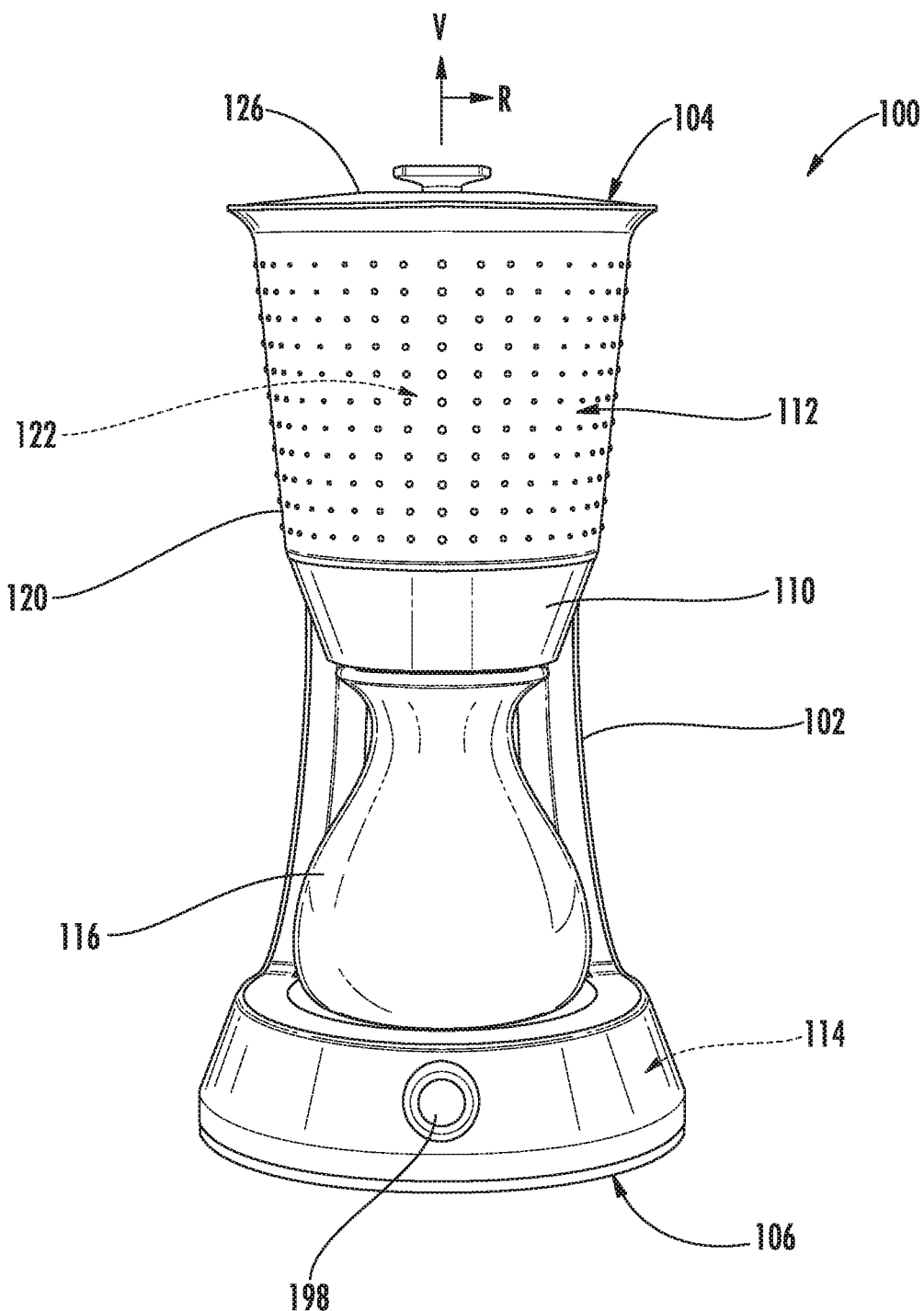
FIG. 1 provides a front view of a beverage brewing system according to an exemplary embodiment of the present subject matter.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment.

Thus, it is intended that the present invention covers such modifications and variations as come within the scope of the appended claims and their equivalents.

FIG. 1 provides a front view of a beverage brewing system, referred to herein as a beverage dispenser 100, according to an exemplary embodiment of the present subject matter. Beverage dispenser 100 generally defines a vertical direction V and a substantially perpendicular radial direction R that extends from a center of beverage dispenser 100. Beverage dispenser 100 includes a housing 102 that extends between an upper portion 104 and a lower portion 106 along a vertical direction V. According to the illustrated embodiment, housing 102 includes a cradle 110 positioned proximate the upper portion 104 of housing 102 and extending substantially along the radial direction R for receiving a brew module 112, as will be described in more detail below. In addition, housing 102 defines a machinery compartment 114 positioned proximate the lower portion 106 of housing 102. As will be described below, machinery compartment 114 may be configured for receiving various operating components of beverage dispenser 100. Beverage dispenser 100 may further include a container 116, such as a carafe, positioned below cradle 110 and brew module 112 along the vertical direction V for receiving brewed beverage.

Figure 2:
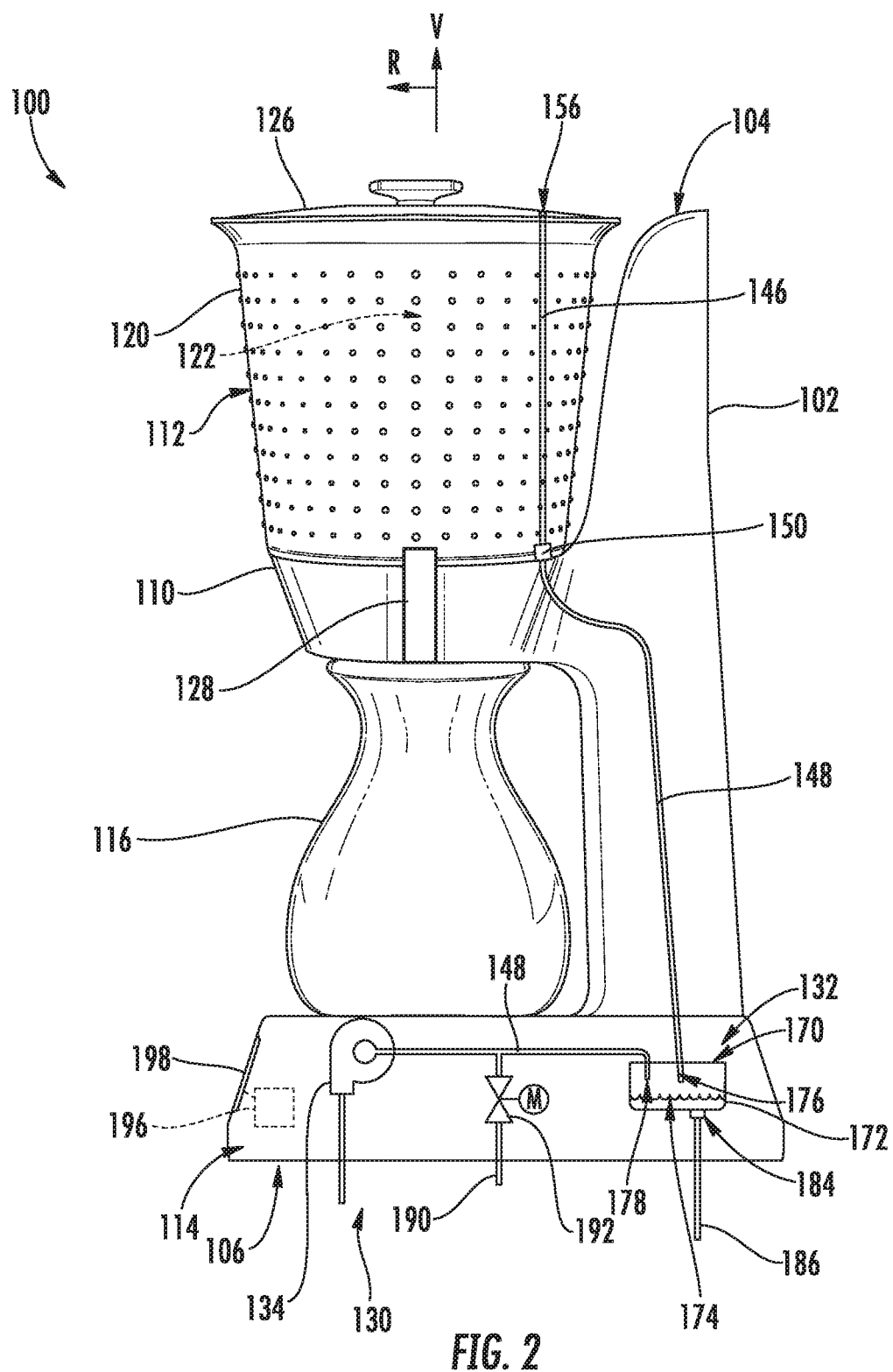
FIG. 2 provides a schematic view of certain components of the beverage brewing system of FIG. 1 according to an exemplary embodiment of the present subject matter.

Referring now to FIG. 2, a schematic view of beverage dispenser 100 will be described according to an exemplary embodiment of the present subject matter. As illustrated, brew module 112 includes a brewing body 120 that defines a brew chamber 122. Brew module 112 may further include a filter 124 (FIG. 4) which is configured for receiving brewing contents, such as ground coffee, and water. Brew module 112 may further include a lid 126 that is removably attachable to brewing body 120 to seal brew chamber 122. Lid 126 may be completely removable or pivotally attached to brewing body 120. A discharge valve 128 may be positioned on a bottom of brewing body 120 for allowing brewed beverage to pass through filter 124 and into container 116 when the brewing process is complete.

Beverage dispenser 100 further includes a vacuum assembly 130. Vacuum assembly 130 is generally configured for drawing air out of brew chamber 122 during a brewing process of beverage dispenser 100. Vacuum assembly 130 generally includes a vacuum line assembly 132 and a vacuum pump 134. Vacuum line assembly 132 is in fluid communication with brew chamber 122 and vacuum pump 134. In this manner, vacuum pump 134 may operate to draw air out of brew chamber 122 through vacuum line assembly 132 to assist in the brewing process. According to the illustrated embodiment, vacuum pump 134 is located in machinery compartment 114 of beverage dispenser 100. Vacuum line assembly 132 passes from vacuum pump 134 up through housing 102 of beverage dispenser 100 before passing into brew module 112.

According to the illustrated exemplary embodiment, vacuum pump 134 is a centrifugal pump. However, it should be appreciated that vacuum pump 134 may be any suitable type of fluid pump having any size, configuration, or position suitable for drawing air out of brew chamber 122 and discharging it to the ambient environment. For example, vacuum pump 134 may be a peristaltic pump, a plunger or piston pump, a bellows or diaphragm pump, etc.

Notably, as vacuum pump 134 draws air out of brew chamber 122, moisture is frequently drawn out as well. For example, even though vacuum line assembly 132 is illustrated as opening into brew chamber 122 proximate a top of brew chamber 122 or immediately adjacent lid 126, overfilling brew chamber 122 with the brewing mixture can result in overflow into vacuum line assembly 132. In addition, as air is pulled into vacuum line assembly 132, moisture in the form of liquid water or water vapor may be entrained and drawn through vacuum line assembly 132 toward vacuum pump 134. Notably, if moisture gets into vacuum pump 134, operating issues may arise including decreased efficiency or complete failure of vacuum pump 134. Therefore, aspects of the present subject matter provide features for reducing or eliminating moisture in vacuum line assembly 132 and/or vacuum pump 134.

Figure 3:
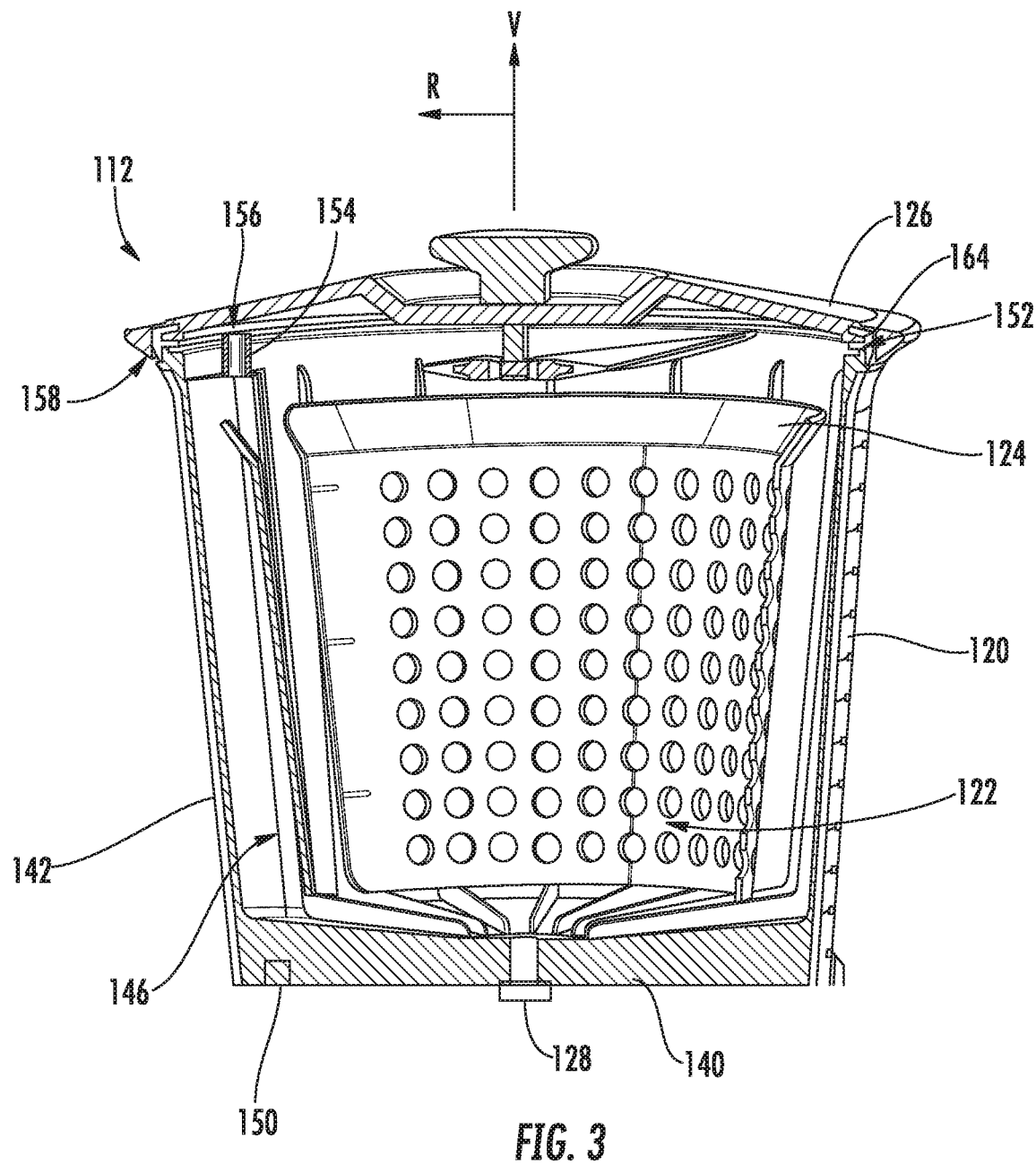
FIG. 3 provides a cross-sectional view of a brew module that may be used with the exemplary beverage brewing system of FIG. 1.
Figure 4:
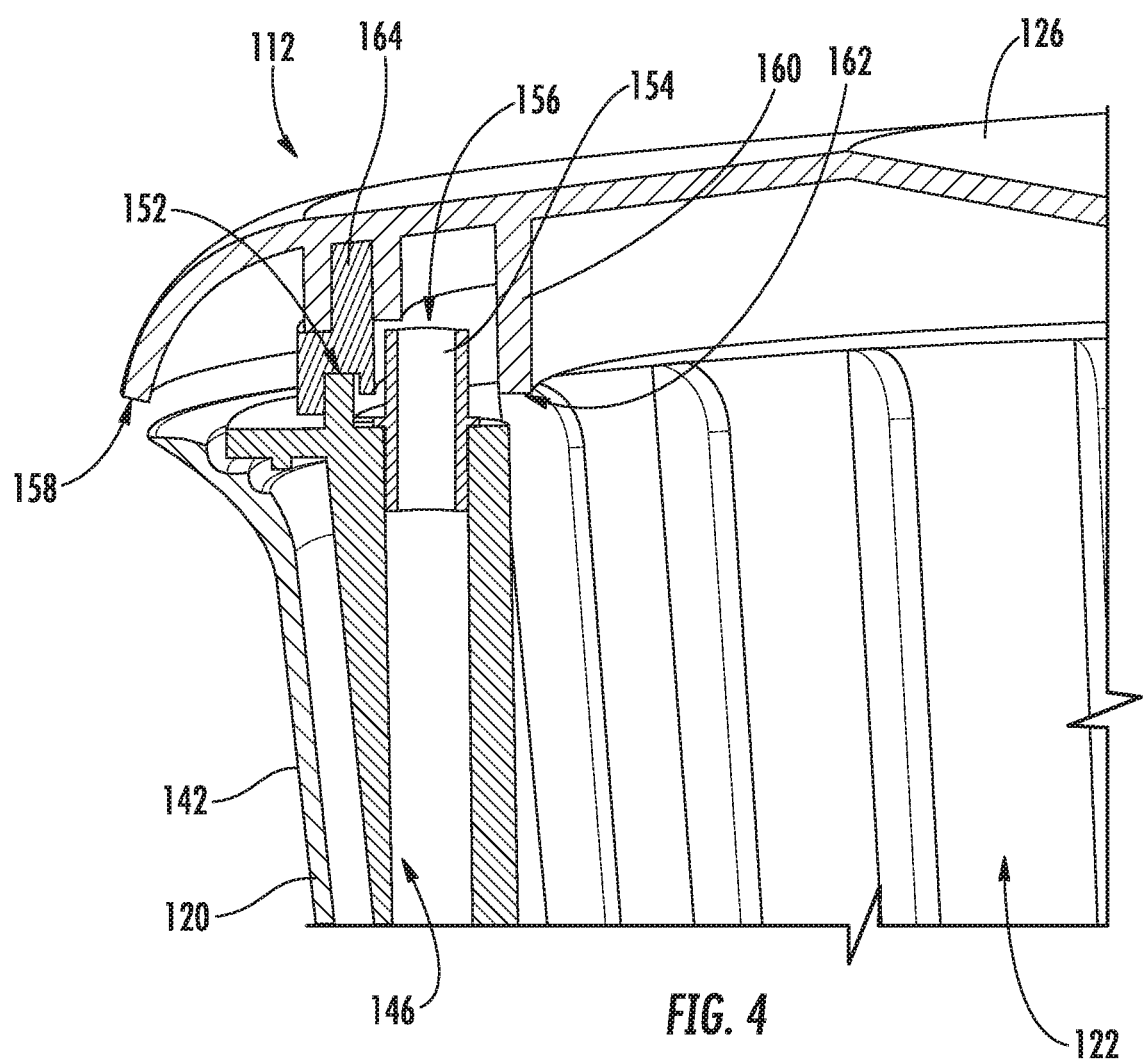
FIG. 4 provides a close-up, cross sectional view of a lid of the exemplary brew module of FIG. 3 according to an exemplary embodiment of the present subject matter.

Referring now generally to FIGS. 2 through 4, brew module 112 and vacuum line assembly 132 will be described in more detail. FIGS. 3 and 4 illustrate two alternative embodiments of brew module 112. However, given the similarities between the two embodiments, similar reference numerals will be used herein to described each of these brew modules 112. Moreover, it should be appreciated that the brew modules 112 are described herein only for the purpose of explaining aspects of the present subject matter. Other suitable configurations are possible.

Referring to FIG. 3, brewing body 120 may generally include a bottom wall 140 and a sidewall 142 extending from bottom wall 140 substantially along the vertical direction V. More specifically, according to the exemplary embodiment, brewing body 120 is substantially cylindrical, having a circular bottom wall 140 and a cylindrical sidewall 142 extending upward from bottom wall 140. In this manner, bottom wall 140 and sidewall 142 define brew chamber 122 which is configured for receiving brewing contents such as a mixture of coffee and water. Although brewing body 120 is illustrated as being cylindrical, it should be appreciated that brewing body 120 may have and other suitable shape and configuration while remaining within the scope of the present subject matter.

According to the illustrated embodiment, brew module 112 has features for making brew module 112 easily removable from cradle 110. For example, according to the illustrated embodiment, brewing body 120 defines a vacuum channel 146 that passes through brew chamber 122 or is integrally formed within sidewall 142. In addition, for example, vacuum line assembly 132 may include a vacuum line 148 that passes through housing 102 and terminates at a docking port 150 defined on cradle 110. Docking port 150 is generally configured for providing sealed fluid communication between vacuum channel 146 and vacuum line 148 when brew module 112 is mounted on cradle 110. Although docking port 150 is illustrated as being positioned on cradle 110, it should be appreciated that according to alternative embodiments, docking port 150 could instead be positioned at any other suitable location on housing 102 to establish fluid communication between vacuum channel 146 and vacuum line 148 when brew module 112 is mounted into beverage dispenser 100.

According to the exemplary embodiment, vacuum channel 146 passes from bottom wall 140 of brewing body 120 toward a top lip 152 of brewing body 120. As illustrated, vacuum channel 146 extends to a position proximate to or below top lip 152 along the vertical direction V. As explained in more detail below, this can increase the likelihood of water or moisture entering vacuum line assembly 132. Therefore, according to the illustrated embodiment, vacuum line assembly 132 further includes a riser tube 154 in fluid communication with vacuum channel 146.

In order to prevent water from being drawn into vacuum line assembly 132 from brew chamber 122, a vacuum port or vacuum inlet 156 is positioned proximate a top of brewing body 120, e.g., above a maximum fill line of brewing body 120. More specifically, according to the illustrated embodiment riser tube 154 defines vacuum inlet 156 and is generally sized and positioned such that vacuum inlet 156 is at a location along the vertical direction V that reduces or eliminates that likelihood of moisture entering vacuum line assembly 132. In this regard, for example, riser tube 154 may define vacuum inlet 156 at a position above top lip 152 of brewing body 120 along the vertical direction V. According to the illustrated embodiment, riser tube 154 is a separate tube that is press fit into vacuum channel 146. However, it should be appreciated that according to alternative embodiments, riser tube 154 may be integrally formed with brewing body 120 and vacuum channel 146. Therefore, as described above according to the illustrated embodiment, vacuum line assembly 132 provides leak-free fluid communication between vacuum pump 134 and vacuum inlet 156 to brew chamber 122.

As described above, vacuum line assembly 132 includes riser tube 154, vacuum channel 146, docking port 150, and vacuum line 148 to place vacuum pump 134 in fluid communication with brew chamber 122. However, according to an alternative exemplary embodiment, vacuum line assembly 132 may be a single conduit that extends from vacuum pump 134, through housing 102, and into brew chamber 122 to a top of brew chamber 122 or immediately adjacent lid 126. Indeed, it should be appreciated that vacuum line assembly 132 may be any suitable combination of conduits, tubes, channels, and passageways generally configured for providing fluid communication between vacuum pump 134 and brew chamber 122. Vacuum line assembly 132 is only one exemplary configuration for providing fluid communication between vacuum pump 134 and brew chamber 122.

Notably, lid 126 may include features for reducing the likelihood of water entering vacuum line assembly 132. In this regard, for example, lid 126 may be dome-shaped, e.g., to provide vertical clearance for riser tube 154 (and vacuum inlet 156) to extend above top lip 152 of brewing body 120. In this regard, for example, lid 126 may define a bottom lip 158 positioned around its peripheral edge and the remainder of lid 126 may be raised, e.g., to provide a void within brew chamber 122 within which vacuum inlet 156 may be positioned. More specifically, according to the illustrated embodiment, vacuum inlet 156 is positioned above bottom lip 158 of lid 126 along the vertical direction V.

In addition, referring specifically to FIG. 4, lid 126 may define a baffle 160 that extends from lid 126 substantially downward along the vertical direction V. Baffle 160 may be a small protruding segment that is positioned only radially adjacent vacuum inlet 156 or may extend circumferentially around lid 126 at a fixed radius. In addition, baffle 160 may be positioned inward from riser tube 154 along the radial direction, e.g., to provide a physical separator between the brewing contents and vacuum inlet 156. In this manner, baffle 160 is generally configured for blocking the splashing of sloshing of water into vacuum line assembly 132, particularly when brew module 112 is being moved and mounted into cradle 110.

Vacuum inlet 156 may be carefully positioned within brew chamber 122 to reduce the likelihood of moisture entering vacuum line assembly 132. For example, according to the illustrated embodiment, vacuum inlet 156 is positioned above a bottom edge 162 of baffle 160 along the vertical direction V. In this manner, large splashes or sprays of water from within brew chamber 122 may be deflected before reaching vacuum inlet 156. Bottom edge 162 of baffle 160 may also be positioned below top lip 152 of brewing body 120 along the vertical direction V, e.g., to reduce the likelihood of water reaching the junction between brewing body 120 and lid 126.

Still referring to FIGS. 3 and 4, lid 126 may further include a circumferential seal 164 that extends around and forms a seal with a peripheral edge of brewing body 120. For example, according to the illustrated embodiment, circumferential seal 164 engages top lip 152 of brewing body 120 to create a fluid seal and make brew chamber 122 air tight. According to the exemplary embodiment, circumferential seal 164 may be a resilient cylindrical gasket that may include one or more ridges for ensuring a proper seal with brewing body 120.

Notably, even by carefully positioning vacuum inlet 156 to vacuum line assembly 132 and strategically designing brewing body 120 and lid 126, moisture may still enter vacuum line assembly 132 under certain circumstances, e.g., overfilling of brew chamber 122, excessive movement of brew module 112, or surges in vacuum pump 134. It is desirable to remove this moisture to improve the operation and efficiency of vacuum pump 134 and extend the lifetime of beverage dispenser 100.

Therefore, according to exemplary embodiments of the present subject matter, beverage dispenser 100 may further include a moisture removal device 170. In general, moisture removal device 170 may be any device that is in fluid communication with either vacuum line assembly 132 or vacuum pump 134 and is configured for removing moisture, i.e., liquid water or water vapor, from air extracted from brew chamber 122. For example, according to one embodiment, moisture removal device 170 may be a conventional phase separator and may include a desiccant such as silica gel or another material for removing moisture from the air.

According to the illustrated exemplary embodiment, moisture removal device 170 includes a water container 172 defining a sealed chamber 174. Sealed chamber 174 is operably coupled with vacuum line assembly 132 and is configured for collecting moisture within vacuum line assembly 132, e.g., water vapor drawn from brew chamber 122. In this regard, for example, water container 172 may define an inlet 176 through which vacuum line 148 passes into sealed chamber 174 in a fluid-tight manner. In addition, water container 172 may define an outlet 178 through which vacuum line 148 may pass out of sealed chamber 174 in a fluid-tight manner.

According to the illustrated embodiment, inlet 176 and outlet 178 are positioned on a top side of moisture removal device 170 along the vertical direction V. In this manner, sealed chamber 174 acts as a fluid tight reservoir that receives air and moisture from brew chamber 122, collects some or all of that moisture, and allows relatively dry air to evacuate to vacuum pump 134. More specifically, liquid water from moisture-laden air may enter sealed chamber 174 and collect or pool at a bottom portion of sealed chamber 174, e.g., due to density differences between the liquid water and water vapor. In addition, at least some of the moisture in the air may condense on the relatively cool surfaces of water container 172 and similarly collect in sealed chamber 174. Relatively dry air may then be drawn from sealed chamber through outlet 178 to vacuum pump 134 where it may be discharged to the ambient environment. Although vacuum line 148 is illustrated herein as being broken into a first portion and a second portion, it should be appreciated that vacuum line 148 may alternatively be a single tube or conduit, e.g., with holes or an opening defined therein for providing fluid communication with sealed chamber 174.

According to the illustrated exemplary embodiment, moisture removal device 170 further includes a drain port 184 and a liquid drain line 186 for discharging the collected moisture. In this regard, for example, when beverage dispenser 100 is not operating, drain port 184 may be opened and the collected water may be discharged to a suitable drain, e.g., under the force of gravity, an external pump, etc. It should be appreciated, however, that alternative embodiments of beverage dispenser 100 may include no drain port at all. For example, collected water may simply be allowed to evaporate and go back into the brew chamber when beverage dispenser 100 is not in use.

According to the embodiment illustrated in FIG. 2, vacuum pump 134 may be in direct fluid communication with moisture removal device 170 and may be operated throughout the entire brewing process as necessary to maintain the required vacuum within brew chamber 122. At the end of the brewing process, vacuum pump 134 is turned off and stops evacuating air, thereby allowing air to slowly leak into vacuum line assembly 132 and break the vacuum in brew chamber 122. However, instead of a slow leak, it may be desirable to quickly break the vacuum by opening vacuum line assembly 132 to the ambient environment.

Therefore, as illustrated in FIG. 2, vacuum pump assembly 130 may further include a secondary airline 190 coupled to vacuum line assembly 132 through a two-way solenoid valve 192. During the brewing process, two-way solenoid valve 192 is closed to assist in maintaining the vacuum in brew chamber 122. However, after the brewing process is complete, two-way solenoid valve 192 is opened to allow a quick inflow of air from the ambient environment to break the vacuum in brew chamber 122. Although secondary airline 190 is illustrated as being connected to vacuum line 148 between moisture removal device 170 and vacuum pump 134, it should be appreciated that secondary airline 190 can be connected at any other suitable location within beverage dispenser 100. For example, according to an alternative embodiment, secondary airline 190 may be coupled directly to drain port 184, thus allowing two-way solenoid valve 192 to control both the breaking of the vacuum in brew chamber 122 as well as the discharge of collected water through the drain port 184.

Figure 5:
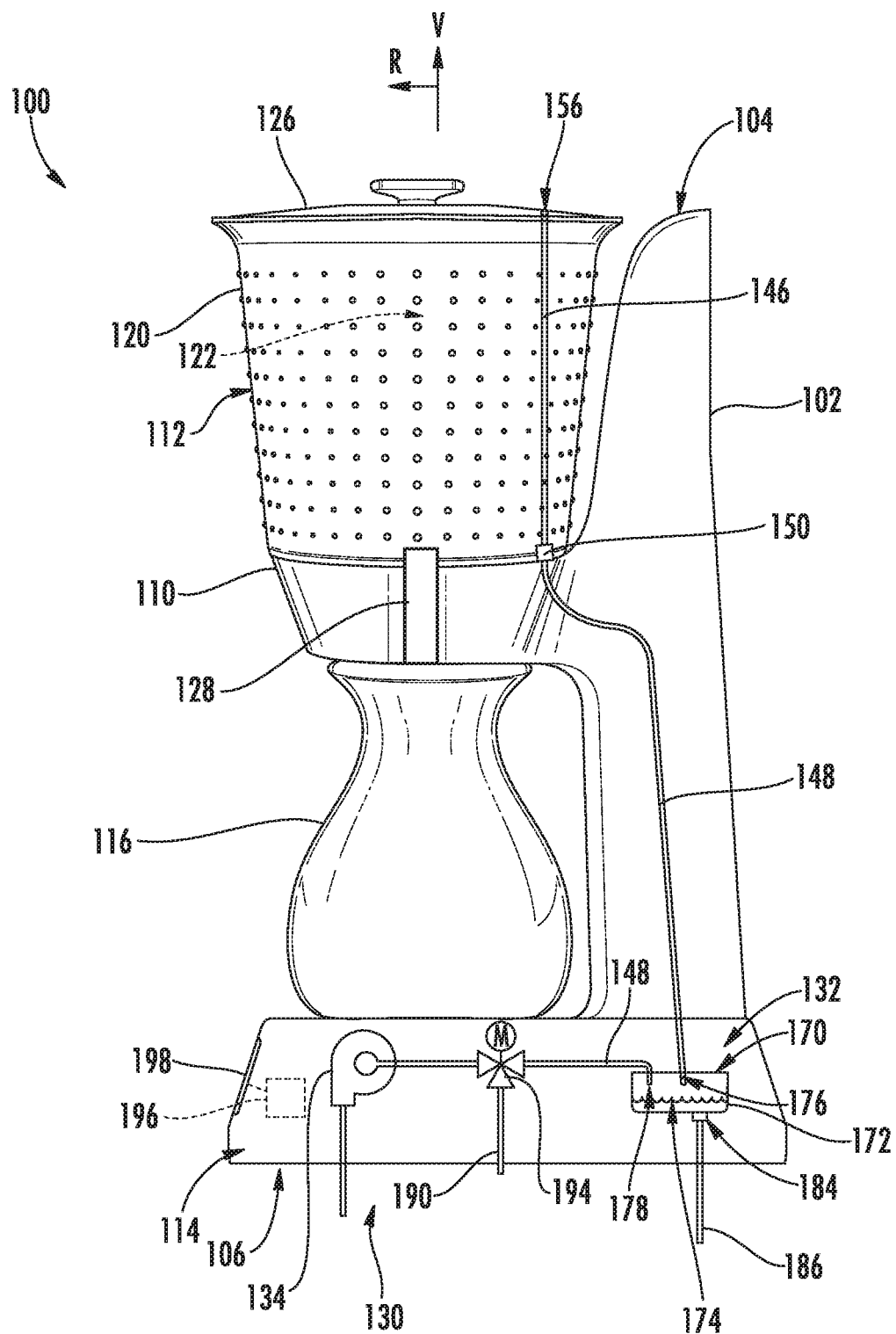
FIG. 5 provides a schematic view of certain components of the beverage brewing system of FIG. 1 according to another exemplary embodiment of the present subject matter.

As illustrated in FIG. 2, two-way solenoid valve 192 is positioned on secondary airline 190. Notably, such a configuration requires that vacuum pump 134 be operated continuously during the brewing process to maintain the necessary vacuum in brew chamber 122. However, given the time of the brewing process, e.g., up to ten minutes, it may be desirable, both to conserve energy and reduce noise, to turn off vacuum pump 134 during the brewing process. Therefore, according to an alternative embodiment illustrated in FIG. 5, secondary airline 190 may be connected to vacuum line 148 using a three-way solenoid valve 194. More specifically, for example, three-way solenoid valve 194 may be located at a junction of vacuum line assembly 132 and secondary airline 190. Three-way solenoid valve 194 may be selectively positionable in three positions depending on the operating state of beverage dispenser 100.

For example, three-way solenoid valve 194 may be rotated to a first position for placing vacuum pump 134 in fluid communication with vacuum line assembly 132, e.g., to allow vacuum pump 134 to draw air out of brew chamber 122. Three-way solenoid valve 194 may be rotated to a second position for sealing vacuum line assembly 132, e.g., to prevent air from breaking the vacuum in brew chamber 122 during the brewing process. In this manner, after a vacuum is created in brew chamber 122, three-way solenoid valve 194 may be rotated to the second position and vacuum pump 134 may be turned off for the remainder of the brewing process. After the brewing process is complete, three-way solenoid valve 194 may be rotated to a third position for placing vacuum line assembly 132 in fluid communication with the ambient environment through secondary airline 190, thereby allowing for quickly breaking the vacuum in brew chamber 122.

Therefore, to operate beverage dispenser 100, a user removes brew module 112 and fills it with the desired brewing contents, e.g., coffee grounds, and water to create the brewing mixture. According to the exemplary embodiment, beverage dispenser 100 is a cold brew coffee machine, and thus the coffee grounds are mixed with cool (e.g., room temperature) water. The user may then replace brew module 112 into cradle 110 of housing 102 prior to beginning the brewing process.

The user may then press a button or otherwise provide a command to start the brewing process, at which time vacuum pump 134 will begin operating to remove air from brew chamber 122. Moisture-laden air will pass through vacuum line 148 into moisture removal device 170 through inlet 176, such that water is collected. Air is then drawn out of moisture removal device 170 through outlet 178 to vacuum pump 134. After a sufficient vacuum is created within brew chamber 122, e.g., about 15 inches of mercury, three-way solenoid valve 194 may seal off vacuum line assembly 132 for the remainder of the brewing process. After the brewing process is complete, three-way solenoid valve 194 may place vacuum line assembly 132 in fluid communication with the ambient environment through secondary line 190 and discharge valve 128 may be opened to allow the brewed beverage to pass into container 116.

Operation of beverage dispenser 100 can be regulated by a controller 196 that is operatively coupled to a user interface panel 198 (e.g., a start button as shown in FIG. 1) and/or various sensors. User interface panel 198 provides selections for user manipulation of the operation of beverage dispenser 100 such as e.g., starting or stopping the brewing process, setting brewing time, etc. In response to user manipulation of the user interface panel 198 or sensor signals, controller 196 may operate various components of beverage dispenser 100, e.g., vacuum pump 134 or solenoid valves 192, 194. Controller 196 may include a memory and one or more microprocessors, CPUs or the like, such as general or special purpose microprocessors operable to execute programming instructions or micro-control code associated with operation of beverage dispenser 100. The memory may represent random access memory such as DRAM, or read only memory such as ROM or FLASH. In one embodiment, the processor executes programming instructions stored in memory. The memory may be a separate component from the processor or may be included onboard within the processor. Alternatively, controller 196 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software.

Controller 196 may be positioned in a variety of locations throughout beverage dispenser 100. In the illustrated embodiment, controller 196 is located within machinery compartment 114. Input/output ("I/O") signals may be routed between controller 196 and various operational components of beverage dispenser 100. For example, user interface panel 198 may be in communication with controller 196 via one or more signal lines or shared communication busses. Thus, operation of various components of beverage dispenser 100, e.g., vacuum pump 134 and solenoid valves 192, 194, may occur based on user input or automatically through controller 196 instruction. Moreover, user interface panel 198 may also include a display component, such as a digital or analog display device designed to provide operational feedback to the user.

One skilled in the art will appreciate that beverage dispenser 100 is used only for the purpose of explaining certain aspects of the present subject matter. Variations and modifications may be made without departing from the scope of the present subject matter. For example, different configurations of vacuum assembly 130 may be used, alternative plumbing configurations are possible, and other changes may be made as well while remaining within the scope of the present subject matter.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A beverage brewing system defining a vertical direction and a radial direction, the beverage brewing system comprising:
   a cradle;
   a brewing body being removable from the cradle and comprising a bottom wall, a sidewall extending from the bottom wall substantially along the vertical direction, the bottom wall and the sidewall forming a brew chamber for receiving and containing brewing contents and water, and a vacuum channel fixed within the sidewall, the vacuum channel extending between the bottom wall of the brewing body and an inlet at a top lip of the sidewall of the brewing body along the vertical direction;
   a lid being removably attachable to the brewing body, the lid including a circumferential seal for engaging the brewing body and sealing the brew chamber;
   a vacuum pump positioned below the brewing body and being in fluid communication with the vacuum channel through a vacuum line, the vacuum pump being configured for drawing air out of the brew chamber to create a vacuum in the brew chamber; and
   a riser tube in fluid communication with the inlet of the vacuum channel, the riser tube defining a riser inlet that extends above the top lip of the brewing body along the vertical direction.

2. The beverage brewing system of claim 1, further comprising a baffle that extends from the lid downward along the vertical direction.

3. The beverage brewing system of claim 2, wherein the baffle is positioned inward and spaced apart from the riser tube along the radial direction.

4. The beverage brewing system of claim 2, wherein the baffle extends from the lid circumferentially at a fixed radius.

5. The beverage brewing system of claim 2, wherein a bottom of the baffle is positioned below the riser inlet along the vertical direction.

6. The beverage brewing system of claim 2, wherein a bottom of the baffle is positioned below the top lip of the brewing body along the vertical direction.

7. The beverage brewing system of claim 1, wherein the riser inlet is positioned above a bottom lip of the lid along the vertical direction.

8. The beverage brewing system of claim 1, wherein the vacuum channel extends to the bottom wall of the brewing body.

9. The beverage brewing system of claim 1, further comprising a docking port fixed to a cradle of the beverage brewing system, the docking port creating a water tight seal between the vacuum channel and the vacuum line when the brewing body is mounted in the beverage brewing system.

10. A beverage brewing system defining a vertical direction and a radial direction, the beverage brewing system comprising:
    a cradle;
    a brewing body being removable from the cradle and comprising a bottom wall, a sidewall extending from the bottom wall substantially along the vertical direction to a top lip of the sidewall, the bottom wall and the sidewall forming a brew chamber for receiving and containing brewing contents and water;
    a lid being removably attachable to the brewing body, the lid including a circumferential seal for engaging the brewing body and sealing the brew chamber;
    a vacuum pump positioned below the brewing body and being configured for drawing air out of the brew chamber to create a vacuum in the brew chamber; and
    a vacuum line assembly defining a vacuum inlet positioned above the top lip of the brewing body along the vertical direction, the vacuum line assembly providing fluid communication between the brewing chamber and the vacuum pump.

11. The beverage brewing system of claim 10, wherein the vacuum line assembly comprises:
    a vacuum channel fixed within the sidewall, the vacuum channel extending between the bottom wall of the brewing body and an inlet at a top lip of the sidewall of the brewing body along the vertical direction;
    a vacuum line providing fluid communication between the vacuum pump and the vacuum channel; and
    a riser tube in fluid communication with the inlet of the vacuum channel, the riser tube defining a riser inlet that extends above the top lip of the brewing body along the vertical direction.

12. The beverage brewing system of claim 11, further comprising a baffle that extends from the lid downward along the vertical direction.

13. The beverage brewing system of claim 12, wherein the baffle is positioned inward and spaced apart from the riser tube along the radial direction.

14. The beverage brewing system of claim 12, wherein the baffle extends from the lid circumferentially at a fixed radius.

15. The beverage brewing system of claim 12, wherein a bottom of the baffle is positioned below the riser inlet along the vertical direction.

16. The beverage brewing system of claim 12, wherein a bottom of the baffle is positioned below the top lip of the brewing body along the vertical direction.

17. The beverage brewing system of claim 11, wherein the vacuum channel extends to the bottom wall of the brewing body.

18. The beverage brewing system of claim 11, further comprising a docking port fixed to a cradle of the beverage brewing system, the docking port creating a water tight seal between the vacuum channel and the vacuum line when the brewing body is mounted in the beverage brewing system.

* * * * *